(12) United States Patent
Narayanan et al.

(10) Patent No.: US 10,761,752 B1
(45) Date of Patent: Sep. 1, 2020

(54) MEMORY POOL CONFIGURATION FOR ALLOCATING MEMORY IN A DISTRIBUTED NETWORK

(71) Applicant: Kmesh, Inc., Santa Clara, CA (US)

(72) Inventors: Kumar Narayanan, Saratoga, CA (US); Saravanan Purushothaman, Nadu (IN); Ramanand Narayanan, Dublin, CA (US)

( * ) Notice: Subject to any disclaimer, the term of this patent is extended or adjusted under 35 U.S.C. 154(b) by 169 days.

(21) Appl. No.: 15/987,316

(22) Filed: May 23, 2018

Related U.S. Application Data

(60) Provisional application No. 62/510,162, filed on May 23, 2017.

(51) Int. Cl.
  *G06F 16/00* (2019.01)
  *G06F 3/06* (2006.01)

(52) U.S. Cl.
  CPC .......... *G06F 3/0631* (2013.01); *G06F 3/0604* (2013.01); *G06F 3/067* (2013.01)

(58) Field of Classification Search
  CPC .......................... G06F 16/125; G06F 11/1469
  See application file for complete search history.

(56) References Cited

U.S. PATENT DOCUMENTS

| | | | | |
|---|---|---|---|---|
| 6,049,853 | A * | 4/2000 | Kingsbury | G06F 12/08 709/213 |
| 2006/0041882 | A1 * | 2/2006 | Shah | G06F 9/4405 717/171 |
| 2009/0094310 | A1 * | 4/2009 | Watanabe | G06F 9/5016 709/201 |
| 2015/0234669 | A1 * | 8/2015 | Ben-Yehuda | G06F 3/0604 718/1 |
| 2018/0329647 | A1 * | 11/2018 | Dai | G06F 3/0647 |

OTHER PUBLICATIONS

Nan Wang, Xuhui Liu, Jin He, Jizhong Han, Lisheng Zhang, and Zhiyong Xu, "Collaborative Memory Pool in Cluster System", International Conference on Parallel Processing, 2007, IEEE Computer Society, pp. 1-8. (Year: 2007).*

Debajyoti Mukhopadhyay, Chetan Agrawal, Devesh Maru, Pooja Yedale, and Pranav Gadekar, "Addressing NameNode Scalability Issue in Hadoop Distributed File System using Cache Approach", 2014 International Conference on Information Technology, IEEE Computer Society, pp. 321-326. (Year: 2014).*

Internet Engineering Task Force, "Data Center TCP (DCTCP)," Nov. 18, 2010, 32 pages.

\* cited by examiner

*Primary Examiner* — Cheryl Lewis

(57) ABSTRACT

An example operation may include one or more of allocating a memory node to a computing memory allocated to one or more computing nodes, allocating a software process dedicated to controlling the memory node, and modifying an existing file system of the one or more computing nodes to replace the existing file system with a new file system that includes the memory node.

16 Claims, 11 Drawing Sheets

600A

600C

MEMORY POOL CONFIGURATION FOR ALLOCATING MEMORY IN A DISTRIBUTED NETWORK

TECHNICAL FIELD

This application generally relates to memory management, and more specifically to allocating memory across computing nodes on a network via solid state disks and memory control units.

BACKGROUND

In view of the growing sizes of data sets used for data analysis and the mode in which some of the large data frameworks operate, the availability of memory, such as random access memory (RAM) in the computing framework is an ongoing constraint. Upgrading/downgrading/allocating, etc., the amount of RAM on a per-session or per-job basis is not easily performed due to constraints with hardware interfaces and other physical constraints.

While the framework of any network may benefit from a larger RAM 'footprint' it is not always easy to create larger RAM footprints as RAM is always limited by physical constraints and costs. Servers with larger RAM footprints usually dissipate more heat, and the cost of such servers can go up non-linearly as the size of RAM footprints is increased. The static nature of RAM limits the availability of such resources in networks with multiple computing nodes and varying levels of operation.

Additionally, with cost and power dissipation issues aside, providing large RAM footprints alone may not solve certain underlying memory constraints. The compute frameworks may operate inside systems, such as a JAVA virtual machine (JVM), which can be limited from an effect known as garbage collection (GC). For instance, the more RAM provided, the larger the JVM spends time performing GC, during which, the system can freeze for brief periods of time. If such an action occurs frequently, the results will be an increase in the job completion time.

SUMMARY

One example embodiment may provide a method that includes one or more of allocating a memory node to a computing memory allocated to one or more computing nodes, allocating a software process dedicated to controlling the memory node, and modifying an existing file system of the one or more computing nodes to replace the existing file system with a new file system that comprises the memory node.

Another example embodiment may include an apparatus that includes a processor configured to allocate a memory node to a computing memory allocated to one or more computing nodes, allocate a software process dedicated to controlling the memory node, and modify an existing file system of the one or more computing nodes to replace the existing file system with a new file system that comprises the memory node.

Another example embodiment may include a non-transitory computer readable storage medium configured to store instructions that when executed cause a processor to perform allocating a memory node to a computing memory allocated to one or more computing nodes, allocating a software process dedicated to controlling the memory node, and modifying an existing file system of the one or more computing nodes to replace the existing file system with a new file system that comprises the memory node.

Yet another example embodiment may include a method that includes one or more of executing a plurality of slave modules in a corresponding plurality of computing nodes, allocating a file system driver module dedicated to controlling a memory node, and initiating a data archive access request via one of the plurality of slave modules.

Still yet another example embodiment may include an apparatus that includes a processor configured to execute a plurality of slave modules in a corresponding plurality of computing nodes, allocate a file system driver module dedicated to controlling a memory node, and initiate a data archive access request via one of the plurality of slave modules.

Still yet a further example embodiment may include a non-transitory computer readable storage medium configured to store instructions that when executed cause a processor to perform executing a plurality of slave modules in a corresponding plurality of computing nodes, allocating a file system driver module dedicated to controlling a memory node, and initiating a data archive access request via one of the plurality of slave modules.

Still another example embodiment may include a method that includes one or more of identifying a data set requiring data analysis identifying a plurality of computing devices to perform the data analysis, assigning portions of the data set to each of the computing devices, and creating key-value pairs for each of the assigned portions of the data set, the key-value pairs identifying the portions of the data set assigned to each of the computing device.

Still yet another example embodiment may include an apparatus that includes a processor configured to identify a data set requiring data analysis, identify a plurality of computing devices to perform the data analysis, assign portions of the data set to each of the computing devices, and create key-value pairs for each of the assigned portions of the data set, the key-value pairs identify the portions of the data set assigned to each of the computing device.

Still another example embodiment may include a non-transitory computer readable storage medium configured to store instructions that when executed cause a processor to perform identifying a data set requiring data analysis, identifying a plurality of computing devices to perform the data analysis, assigning portions of the data set to each of the computing devices, and creating key-value pairs for each of the assigned portions of the data set, the key-value pairs identifying the portions of the data set assigned to each of the computing device.

DETAILED DESCRIPTION

Figure 1:
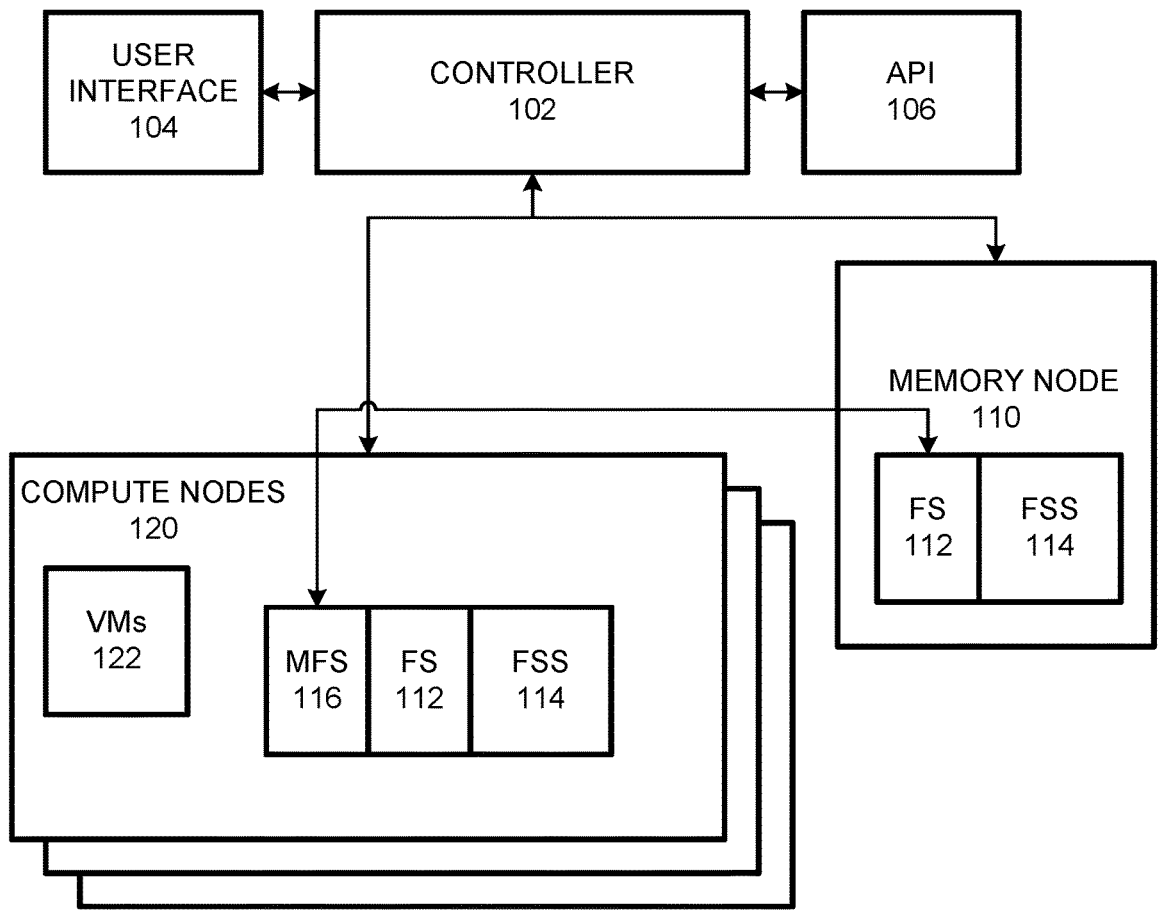
FIG. 1 illustrates a logic diagram of a memory pool configuration for distributed memory of computing nodes, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support compute nodes and servers where compute frameworks operate. Ideally, those compute nodes and servers may operate without needing any hardware changes, such as RAM upgrades. By not relying on an already existing large RAM footprints, and instead using fast storage technologies such as non-volatile memory express (NVMe), and high-speed serial advanced technology attachment (SATA) with solid-state disks (SSDs), RAM may be dynamically allocated and managed by a central controller device with access to a memory pool, which is accessible over a network of nodes. Such configurations provide a way to circumvent periodic mandatory upgrades to the computing nodes' hardware configurations, which may require opening servers, adding disks, and/or preserving the existing dynamics between computing frameworks and computing nodes.

A memory pool or memory 'lake' product may provide a large-scale RAM compatible memory resource that can be shared among computing nodes. The memory pool may permit the use of high-speed storage devices such as NVMe and/or SSD instead of conventional RAM hardware. The software applications may be customized to operate with small amounts of RAM in each computing node, while providing an actual large memory file-system to the network computing framework. The data is stored in storage devices, such as NVMe and/or SSDs, and the data is configured to appear as if it is originating from a memory file-system. In other words, the central memory pool or memory node uses less expensive hardware as compared to just large-scale quantities of RAM. Also, the high-speed read/write capabilities of storage hardware, such as NVMe and/or SSD provide a fast memory file-system that permits certain frameworks to complete jobs faster.

FIG. 1 illustrates a logic diagram of a memory pool configuration for distributed memory of computing nodes, according to example embodiments. Referring to FIG. 1, the configuration 100 includes a series of compute nodes 120, such as virtual machines 122 receiving allocated memory resources from a memory file system 116 that manages a file system 112 and a file storage server 114. The memory node 110 may be an array of solid state disks which are accessible via a computing node on a network and in communication with the compute nodes 120. The higher-level resources used to implement the memory node include a user interface 104, a controller 102 and an API 106 configured to receive commands and makes changes to the memory node 110. The portions of the memory pool configuration include distributed and modular components.

The memory 'lake' memory node 110, for example, exposes a HADOOP distributed file system (HDFS) system to certain compute frameworks. The memory lake then uses storage and provide semantics of a memory file system. The application software uses a certain amount of RAM (e.g., 64 MB of RAM for every GB of data being concurrently handled in each node) and supplements that RAM with storage devices, such as NVMe an/or SSD. Each node on the network may receive a RAM allocation based on the data assigned to that particular node. The other memory types may also include RAMDISK and other storage class memory, such as 3DXP or NVDIMM. However, for purposes of this disclosure, the emphasis is on NVMe and SSD file storage, given that those types of storage devices are the most available ones at a reasonable cost.

The memory lake configuration of the memory node 110 of FIG. 1 is able to expose data from disparate FSs 112, such as HDFS, in a manner that is managed by the active applications written for the large data network frameworks, such as HDFS, Map-Reduce (MR), Spark etc. This customized configuration of the memory lake has a driver node function (i.e., software process) that is able to provide data from different file systems (HDFS and other types) in the same way HDFS would normally operate. Also, the memory lake is able to provide such functionalities without any change needed to applications or to the compute frameworks. The memory lake requires only a few configuration changes. For example, in the configuration, instead of specifying HDFS as the file system (FS), a custom memory file system will be specified as the file system (FS) for the compute framework (i.e., hdfs://<namenode>:<port> is replaced with mfs://<mfs driver FQDN>:<port>) in a SPARK and/or HADOOP configuration file.

In general, the MFS is the memory file system, which implements file-system proxies to various file-systems: HDFS, NAS, S3, etc. MFS presents data from the file systems in a format that is compatible to HDFS and the corresponding applications, with no change to the framework or the applications, except the FS configuration change from HDFS to MFS. The MFS is made of workers and a driver. The driver plays the role of the name node to systems, such as YARN, and is redundant, while workers/slaves, running in each compute node, handle data I/O. Applications and framework may make I/O requests to the MFS for data requirements. The MFS is the component that interacts with the underlaid FS and with the application, and uses FS to operate as if there is a large memory space available. The FS 112 is the file system that manages data between compute nodes and storage disks, and processes all the I/O requests from the MFS. The FS is the component that gives the MFS the notion that it has a large memory FS footprint. FS 112 is also responsible for maintaining data integrity of the data written by the MFS, which in turn is generated by the framework/applications.

The FSS 114 is the file storage server, which processes block read/write requests from the FS. The FSS writes/reads blocks into LINUX volume manager (LVM) partitions and LVM partitions can be created with features, such as RAID for higher data I/O, data protection, etc. The FSS needs to be able to perform block I/O into LVMs. The FS 112 is where source-data exists and results are written and the examples of the underlay file systems include HDFS, NAS, S3 etc. The 'memvisor' acts as a proxy-gateway between compute frameworks and the FS that actually stores data. The memvisor will read data from the underlay FS, per application demand, and provide the data in a manner that applications and frameworks understand, such as in HDFS compatible format.

The memory node 'MemNode' is the node that holds banks of NVMe and/or SSD that acts as memory extensions for holding data. The 'MemNode' can be any standard x86 server running LINUX with a large amount of storage. The memvisor communicates to the S/W process (FSS) in the MemNode to read/write blocks of data. A dedicated MemNode can be replaced by a NVMe and/or SSD attached to each compute node. The controller 102 is responsible for provision, configuration, and monitoring functions and is realized as software processes. The controller instances operate on separate servers or VMs outside of the cluster and outside of the MemNode 110. All user/administrator interaction will be performed through the controller web GUI 104 and/or using the REST API 106. In operation, the controller 102 should be isolated into a management network, that is used for control, provision, and monitoring operations. One example may provide three instances of controllers on three separate machines which are deployed for mission critical applications since one controller instance can fail and all monitoring and provisioning functions will continue uninterrupted. The MFS 116, FS 112, and FSS 114 are all LINUX processes, and one skilled in the art will appreciate that other operating systems may instead be used to implement such processes. All the software processes operate in the user space on the LINUX OS. In other embodiments, CMFS, CFS, and CFSS may partially or may all not be LINUX processes, and may include some form of hardware.

The controller 102 is a realization of management and control functions. The controller operates to perform installation, provisioning, and monitoring of various components of the memory node 110. The MFS driver is a separate logical software process that provides meta-data services for all data handled by the MFS slaves. The MFS driver exposes an interface similar to HDFS to applications and to schedulers such as YARN. When the system operates, the MFS slave implements a JAR (JAVA archive) into the JVM that operates the compute framework. This JAR is referred to as a client JAR, which is executable in JAVA. The client JAR implements logic to communicate with the MFS drive process for meta-data, and the underlaid FS, such as HDFS, NAS, S3 etc., and interacts with the MFS slave for data access stored in the memory node 110. The client JAR is responsible for processing all the I/O requests from the compute frameworks. This client JAR will check with the driver process if the blocks it needs from the underlying FS already exist. If not, the I/O request will be made to the FS. If it exists, then the client JAR will contact the MFS Slave, which has its own local cache. If the block requested exists in the local cache, MFS will deliver it. If not, MFS will post a read request to the FS. The read request uses an optimized form of the NFS (network file-service) protocol. MFS uses the NFS client capability of the compute node. The over the network NFS requests are transferred to the memory node, where the user-space NFS server decodes the NFS protocol and provides it to the FS for processing. The CFS looks-up the local meta-data stored in RAM and calls the FSS to read the appropriate blocks from the disks, and writes from the FS slaves are also handled similarly.

Each compute node receives a mount-point over the network, that terminates in the memory node 110. This fundamental design permits the compute nodes to share data with one another. Irrespective of whether memory node 110 processes run in the same server as that of the MFS, or if the memory node 110 processes appear as pooled across a set of MFSs, the interaction is over a network. In the former case, where the MFS and memory node 110 both run in the same node, the network connectivity is provided over a loopback interface and in the latter case, where the memory node 110 is in a dedicated server connected over a network, the NIC and network switches are used for communication.

Figure 2:
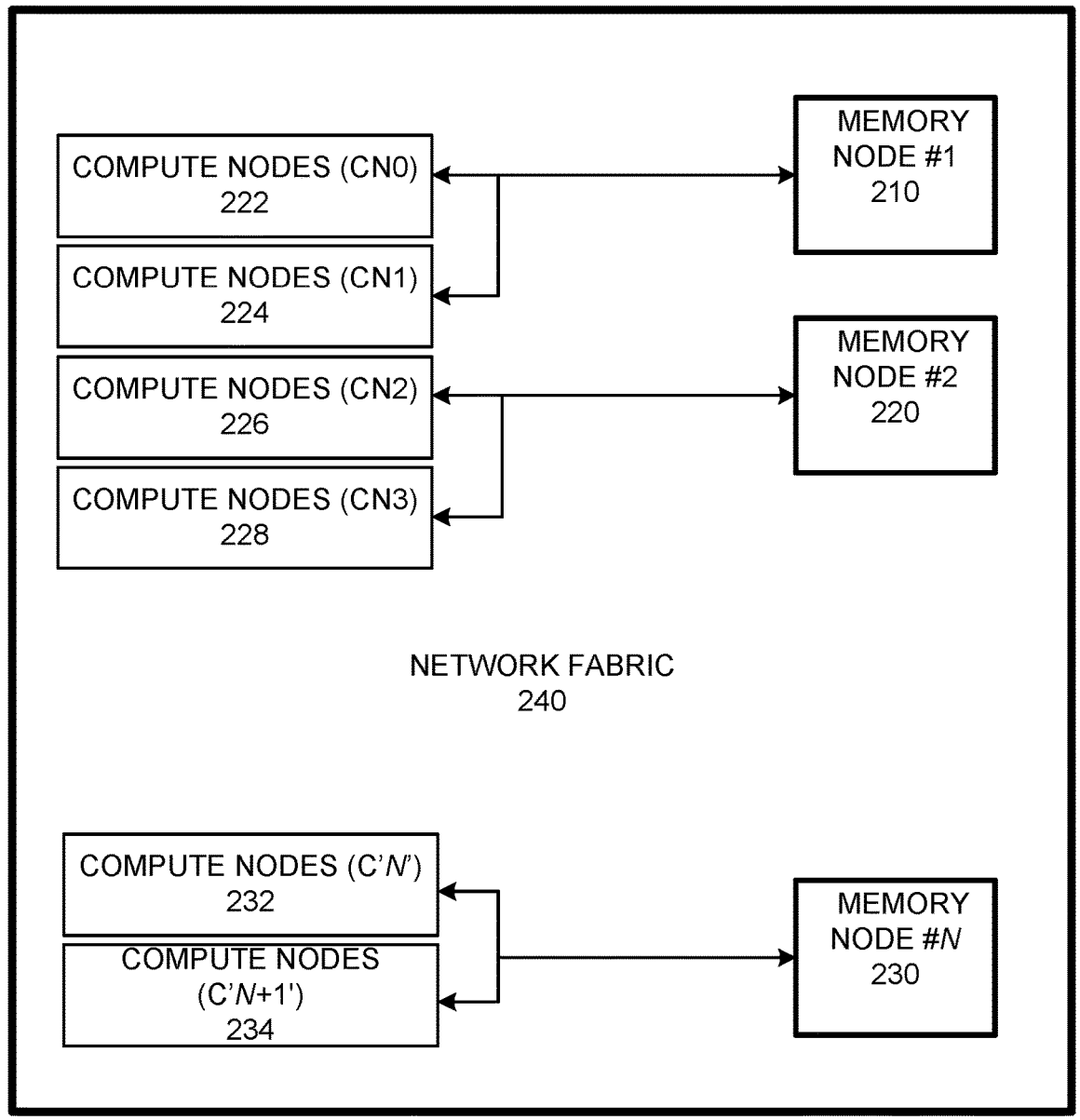
FIG. 2 illustrates an example computing node and memory node allocation in a network, according to example embodiments.

FIG. 2 illustrates an example computing node and memory node allocation in a network, according to example embodiments. Referring to FIG. 2, the configuration 200 provides that the memory nodes 210, 220 . . . 230 hold the NVMe and/or SSD drives for a particular cluster. In the example of a single memory node, the single memory node can service several compute nodes of a cluster, a single memory node won't suffice for a large cluster. The memory nodes are horizontally scalable. That is, several memory nodes can be combined to cater to a large cluster of compute nodes 222-234. The example in FIG. 2 illustrates several logical memory nodes which may be physically two or more nodes, with only one being active and others as standby nodes.

In this example, the various compute nodes may include any number of compute nodes, and the allocation to memory nodes may be two or more compute nodes to one memory node in the network fabric 240. Depending on the bandwidth needs of the cluster of computer nodes, the amount of data a cluster needs, a number of compute nodes and memory nodes, may all be related factors. In an ideal scenario, 32 CN nodes may participate in a single memory node with multiple memory node sub-units 210, 220 . . . 230. Examples of bandwidth may include up to 4×40 GbE for NIC ports, a dual-socket or higher CPU and 64 to 128 GBs of RAM, 16×NVMe drives, any of which can be more or less depending on capacity needed and/or I/O throughput of the NVMe drives. In this example, the memory node can write at 1 GB/S per NVMe, perform storage I/O of 16 GB/S or 1 GB/S per NVMe×16 NVMe, and the N/W throughput is 16 GB/S or 128 Gbps. The rate of 1 GB/S is used as an average value across several types of NVMe drives and it can be more if higher speed drives are used.

For a larger cluster, more memory nodes are needed as illustrated in FIG. 2, the number of memory nodes are "N". The cluster has several nodes, the last one being CN+1. Each compute node is mapped to a single memory node. While many compute nodes can be mapped to a single memory node, in general there is one unique memory node to which a compute node is mapped. The mapping between compute nodes and memory nodes are handled by the controller software and is not a manual process.

In the generic case of a large cluster mapping to multiple nodes, a new procedure is used for data transfer when data that was read or generated by one node is needed in another node. In a normal case, data retrieved by a MFS slave from one node is visible only to the slave in that node. In several use cases data retrieved by one node is needed in another node. Applications often need data in one node that's already read by another node.

Figure 3A:
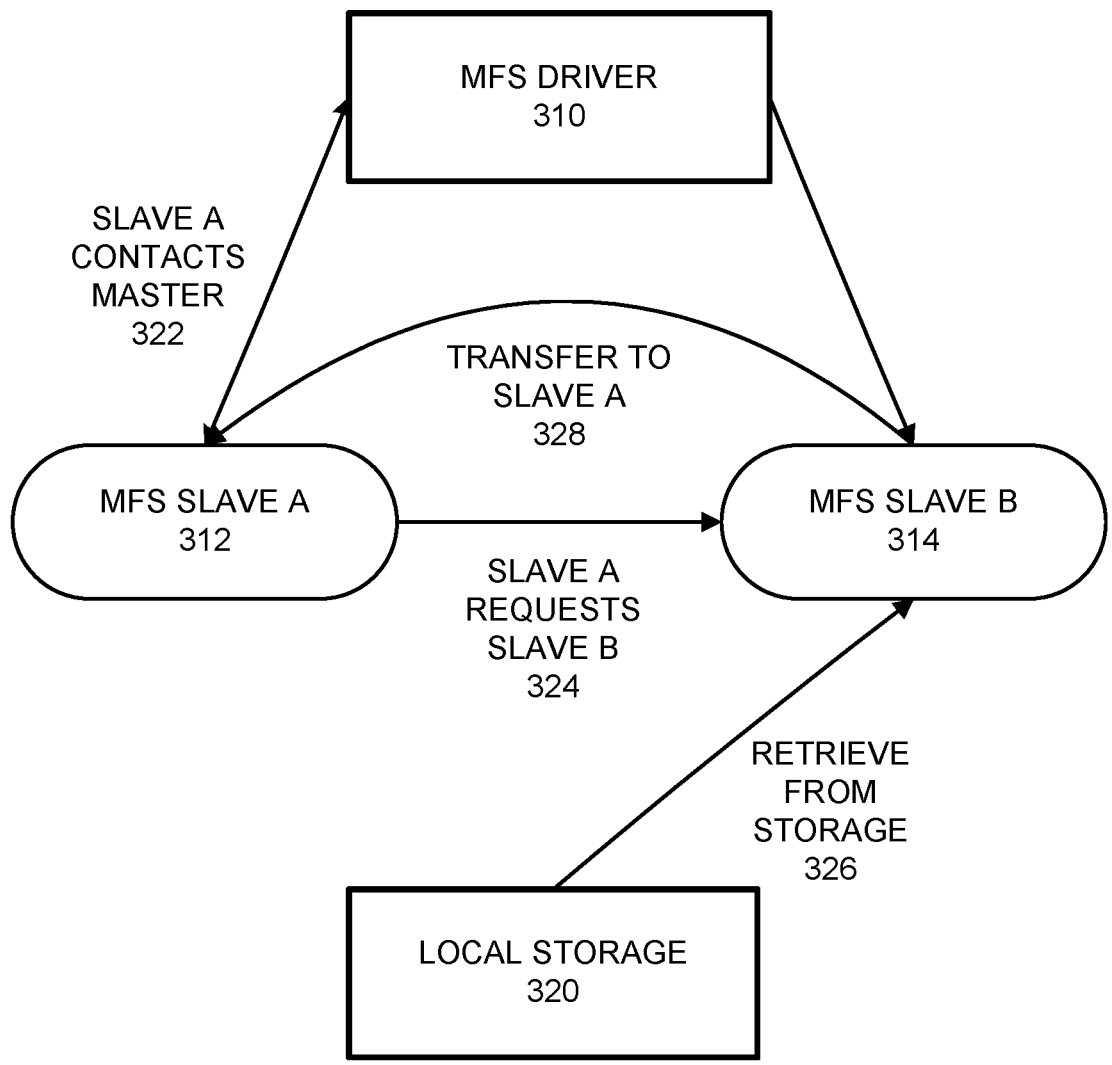
FIG. 3A illustrates a memory file system management configuration for allocating memory from local storage, according to example embodiments.

FIG. 3A illustrates a memory file system management configuration for allocating memory from local storage, according to example embodiments. Referring to FIG. 3A, the configuration 300 provides an example where the MFS slaves use an MFS driver during a memory access operation. The MFS slave 'A' 312 may initiate the operation by contacting the master 322 via the master driver 310. The driver 310 then informs the slave 'A' that the slave should contact another slave 'B' via request operation 324. This slave 'B' 314 then retrieves data 326 from the local storage memory node 320 and then sends the data to the slave 'A' as the node that made the request for data via a transfer operation 328. As can be observed, this operation involves two network trips for the data to be transferred.

In the event that the MFS slave A 312 is making the request to MFS slave B 314 for data, the master may dictate an instruction to seek slave B 314. Now, MFS slave B will read the data from the memory node, store the data in the node where MFS slave B is operating, and then transmit the data to MFS slave A 312. This procedure includes two network trips one from the memory node to MFS slave B 314, and the second trip from MFS slave B 314 to MFS slave A 312. Such a configuration is viable, however, another approach may be used as illustrated in FIG. 3B.

Figure 3B:
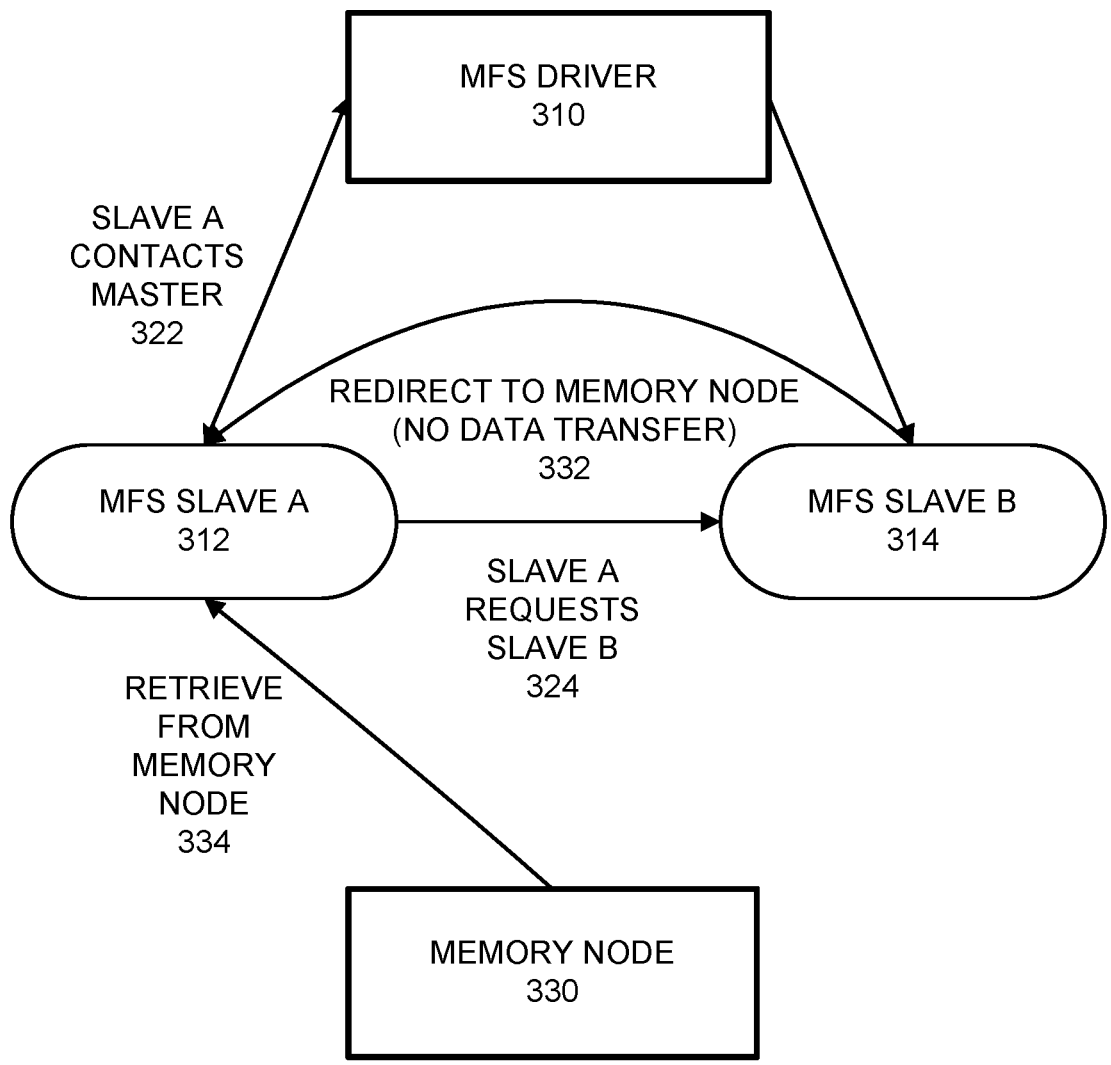
FIG. 3B illustrates another memory file system management configuration for allocating memory from a memory node, according to example embodiments.

FIG. 3B illustrates another memory file system management configuration for allocating memory from a memory node, according to example embodiments. Referring to FIG. 3B, this approach 350 includes the MFS slave A receiving an I/O request from an application which requires a memory access operation. The MFS slave A 312 consults with the MFS driver 310 and receives a response from the MFS driver that the data exists under the MFS slave B 314. The MFS slave A contacts MFS slave B via the same operation 324, however, in this case, the redirect operation 332 from slave B is received and then slave A 312 can identify the path information needed, which is provided from slave B, with regard to all blocks requested to MFS slave A 312. The MFS slave A 312 can then retrieve the data directly 334 from the memory node 330. As can be observed, the example operation cuts down one network trip thus improving efficiency of data transfers overall. This example may be for a request from slave A for 20 GB of data that exists under a known location associated with slave B. In the example of FIG. 3A, there are two I/O operations involved. One is for slave B to read data from its local disk or from the memory node, and then send that data over the network to slave A. In the example of FIG. 3B, the "redirect" sent to slave A indicates the full path to the data that exists in the memory node as a distributed memory source. In this approach slave A retrieves data from the memory node directly, and thus reduced the needed I/O operations to just one operation. Slave A will receive data faster, as the memory node has been constructed with NVMe drives and the software is optimized to transfer data between the memory node and the compute nodes/slaves faster and with higher efficiency. Both operations are viable solutions, however, one approach may be optimized to perform faster access and lower bandwidth requirements.

When large data network frameworks analyze data, usually the compute engines adopt a divide-and-conquer strategy. The engines may break a terabyte (TB) of data into smaller chunks, about 50 GB each, and then up to 20 servers can analyze those blocks in parallel. An obvious fact from that approach is that each node has only a view of the fraction that it analyzed. The node that acted on the 'chunk' and 'mapped' the data may map the data into a key-value pair. In the process of such a mapping activity, it is conceivable that there will be several keys and each such key may have one or more values associated with that key. However, each node has mapped only those data chunks that it was given to 'map'. To illustrate this approach, suppose that 100 TB of data is to be analyzed by four servers. The idea behind the big data processing is that many computers can analyze data in parallel, and thus, each node analyzes 250 GB of data, on average in this scenario. In reality, each server may not analyze exactly 25% of the data, in fact, the number may vary between 24% and 26%. Each server node, also called compute node, generates a "key-value" (KV) pair from the data given to itself, essentially mapping the data. Generating the KV pairs is one of the approaches to reducing the data size and bringing the data to a format where further analysis can be performed. In one example, the servers may be analyzing TWITTER feeds, and a simple KV pair could be based on a 'user-timestamp' pair where the user is the key and the value is when the user tweeted. Many such KV pairs can be created as part of the data analysis. Given that each server has only 5% of the data, the generated KV pairs (or mapped data) in each node does not encompass the entire data. If four unique keys are generated each node handles data for one of the keys. The number of keys does not have to match the number of nodes. There are "n" keys in the HDFS framework which will be spread as uniformly as possible. A perfect distribution may not occur always, for instance, if there are five keys then one of the nodes may have to handle two keys. The KV pairs are distributed across a compute node, as the data was distributed across multiple compute nodes. The KV pairs need to be reduced, where one of the nodes has to collect from every other node the mapped data for a given key, and then combine all the data for a single key into a special KV pair, where the key now has a list of all data.

In this example, one node collects all data from all other nodes for the TWITTER user, 'user1', and outputs a result, such as: {user1, <ts1, ts2, ts3, ts4, ts5, ts6, ts7>}, where 'ts' stands for timestamp. Each node, before it sends data for a given key to the node designated as the reducer for the given key, sorts the data. Supposing that node B is reducing data for user1, based on the above example, node A will send {user1 <ts1, ts2>} to node B, where ts1 and ts2 are in ascending order and node A sorts the timestamp values before sending them to Node B. Other nodes will send data to node B for 'user1' in a similar sorted fashion. This operation constitutes a "sort-and-shuffle" phase. In the case of four nodes, with four unique keys, each node will send data for up to three keys to other nodes. If the keys are K1, K2, K3, and K4. Then node A will handle K1, node B will handle K2 and so on. Node A will receive from the other three nodes mapped data for K1, while sending its mapped data for K2 to node B, K3 to node C, and K4 to node D. All other nodes will perform similar operations. This approach may be a combination of mapping, sorting and shuffling to reduce data load.

Each compute node may store the mapped data, as it does its own mapping, into its local disks, over a local file system. Several times such an I/O operation may occur when some chunk of data is collected. Usually, the chunk size is about 100 MB to under one GB of data. In order to complete the analysis, a next step called "reduce" needs to be performed. In the reduce phase, a single node handles all the values for a single key. As was noted earlier, the keys are now distributed across several nodes. That is, each node has several keys and associated values for the chunk of data being analyzed. Now, to 'reduce' effectively, every node that has values for a given key needs to be funneled to a single node. The above operation is called a "sort-and-shuffle" phase. That is, each node combines the values from a given key in a sorted order and then transfers and/or shuffles the keys to the anointed node. The large data system has constructs to inform each node as to which node in the cluster will reduce all the values for a given key. As can be observed, this is a costly operation, and as the number of compute nodes increase the shuffle traffic can lead to huge amounts of data transfers, for example, in an "n" node cluster, each node will transfer to up to "n−1" other nodes, and thus, the result is on the order of n^2.

To overcome the issues posed by shuffle traffic handling, instead of maintaining the data locally in the compute node itself. The data is moved to a memory node so the shuffle data approach can now take advantage of a faster storage technology, such as NVMe, which can be technically and operationally difficult to introduce in a compute node architecture. Certain meta-data may be included in each compute node so that each node is referencing the data as if the data was locally stored on each node. Then, any file I/O command to the local node is actually satisfied from the memory node. This may be accomplished by file-mount points on the local node, that are mapped to the NFS mount point in the memory node.

Usually, the path for storing shuffle data points is performed to a local directory, which is usually in the root file-system. Occasionally, special disks, such as SSD, are added for this shuffle traffic. With the memory node, the path is mapped to a partition allocated over NFS, pointing to a partition in the memory node. This partition will be served by a YFS as an add-on overlay component that runs on top of the FS. YFS caters to all arbitrary file-system commands for shuffle traffic, and adapts the operations so that FS is not exposed to vagaries of the shuffle sub-system file operations. The shuffle traffic is sent to the memory node and benefits from high-speed storage without having to be sent to the cluster nodes. As the shuffle traffic accumulates in the memory nodes across various partitions, the "shuffle meta-data push" daemon begins sending the data to the "shuffle meta-data agent" in each compute node, thus populating the meta-data of the shuffle spills into the compute nodes. This will then permit each compute node to fetch the shuffle data from the memory node directly, as if the data exists in a local partition in the compute node. This permits for faster data transfers and processing in each compute node.

There are several file-systems that may be used in the LINUX infrastructure, such as XFS, EXT3, EXT4, GLUSTER FS, etc. In general, all those file-systems either use another file-system underneath, and do not deal with low-level meta-data issues, or the file-system uses a log-structured model for meta-data. Examples of such file-systems include CEPH, which runs on XFS, EXT3, etc. HDFS is also such a file-system that uses a local file-system such as EXT3, EXT4, or XFS. CEPH and HDFS, and similar file-systems, manage meta-data for the way these FS visualize data. For instance, HDFS maintains meta-data in a namenode for 128 MB or 256 MB blocks. In general, for any local file-system that uses block devices directly, such as XFS, EXT3, ECT4, etc., those file-systems maintain meta-data, usually called INODES, relationship between these INODEs etc., are maintained in a 'journal'. This journal is maintained as log-structured data. Every operation is logged, and kept in some kind of storage, usually in the disk itself. The log permits replay of the actions in case of corruption in the file-system data. All file-systems usually balance between the frequency of journaling and the performance.

A log-structured FS (LFS) works by keeping an INODE MAP that provides the location of INODEs. The INODE MAP itself is stored in the log. The INODE MAP updates require old versions be read, modified, and a new version be written to the log. The location of INODE MAP is indirectly defined by a SUPERBLOCK. The SUPERBLOCK itself is fixed and has pointers to locations in disks where a checkpoint region is defined. The checkpoint region has pointers to most recent blocks in the INODE MAP and to the last checkpoint in the log. The concept is that upon failure, entries from the last checkpoint are replayed to bring the FS back to a consistent state. The LFS also needs a robust space recovery model. Free space from old segments that are not valid need to be recovered. To prevent fragmentation, the approach taken is to first move live parts from old segments to the end of the log, and reclaim large chunks, rather than segmented chunks. Given that a journal involves taking the old state, waiting for a new action to occur, updating the meta-data, and then writing the meta-data, will cause the system to slow down. File-systems accumulate some of the logs in RAM, and then write the accumulated data to a medium sized disk write rather than several small writes to a disk.

To speed up, an in-memory INODE MAP may be maintained. As can be seen when the disks start to become full, the cost of space recovery and the effort to prevent segmentation can lead to somewhat higher overheads. There is also the concept of the journal FS, where either meta-data only, or both meta-data and data are written to a journal. The FS component of the memory lake of the example embodiments uses an innovative approach to keep the meta-data updated. The FS creates a consistent meta-data for every block of data being written into disk. The FS does not use the typical log-structured data for meta-data integrity. The FS takes advantage of some of the characteristics of the file-system data when operating under the HADOOP structure. The files are usually analyzed, and not modified. In particular, there are no read-modify-write operations. Further, the size of blocks consumed are also large, such as 64 MB to 512 MB or even 1 GB. Data generated by operations, such as shuffle in MRv2 or RDD (Resilient Distributed Dataset in Spark) are immutable objects.

The approach permits the FS to be able to construct meta-data in RAM, and permit for meta-data redundancy by piggybacking the meta-data as part of acknowledging a close operation to the application. There are two distinct components that permit for a reliable file-system presented by the FS that extremely optimized for performance. The meta-data updates are performed as byte operations, and not as log-structured records. The byte-based model permits for extremely fast updates to INODES. The INODES are created in a tree-like structure. In fact, the meta-data is maintained by PMEM.IO which gives a consistent view between meta-data and data written into the disk. The meta-data is preserved in the CMFS driver, which itself is redundant.

According to example embodiments, a method for storing meta-data provides a user-space based UDP with ECN-based congestion control for low-latency reliable transport. In general, I/O in LINUX requires most applications to operate with open sockets and use the TCP/UDP, IP, and Ethernet stack in the LINUX kernel. This approach may not be optimal for latency sensitive applications. For example, in the case of distributed storage, where objects needed by an application operating in a compute node are distributed across few nodes in the same cluster, in this case, the application makes a connection, usually a TCP connection, to other nodes in the cluster where such objects exist. The packet path for the retrievals operate through a LINUX kernel. This provides that the application in the user-space of the LINUX OS needs to make a context switch to the kernel. Then, data either needs to be copied from the application to the kernel (i.e., transmit path), or data from the kernel needs to be copied to the application from kernel (i.e., receive path). Additionally, the network interface card (NIC) typically interrupts the kernel when it has data to provide to the kernel, which, in turn, is passed on to the application. This kind of interrupt driven model combined with kernel scheduling introduces latency jitters. For instance, for a given host trying to retrieve data from another host where all other variables are the same (e.g., number of network hops, no congestion in switches along the path, same interface speed), then the time it takes to get a fixed amount of data varies largely.

In fact, tests run with a kernel TCP as the transport layer has shown latency varying between 300 micro-seconds to 1.2 milliseconds. The test case involves operating two hosts each connected to a 10 Gb switch. The switch has no congestion, and the delay introduced by the switch is very low, of the order of a few microseconds or less. All connections are over 10 Gb between hosts using six foot long cables, and thus, transmission delays are practically zero. A big part of the latency is the time spent in the kernel networking stack on the two hosts. As for the issues associated with retrieving objects from different servers, it is obvious to note that when objects are retrieved from spinning disks, the absolute latency and associated jitter do not matter. The reason for this is that data retrieval from spinning disks can take a few 10s of milliseconds. So, a network latency component of a few 100 microseconds, or even 1 millisecond, have no real impact, as they represent a smaller delay than the latency of data retrieval from spinning disks.

Figure 3C:
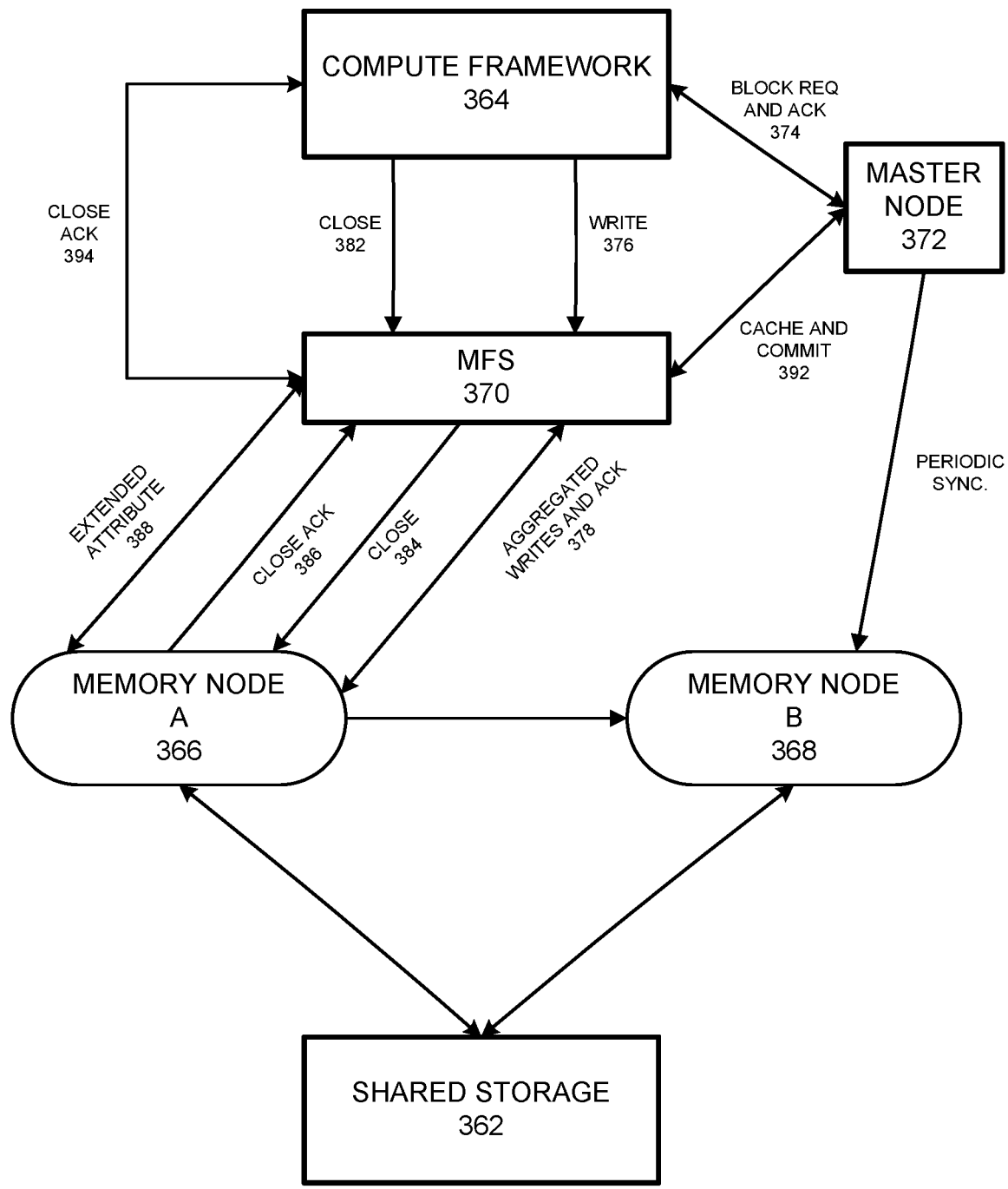
FIG. 3C illustrates a memory file system management configuration for allocating memory from a shared storage configuration, according to example embodiments.

FIG. 3C illustrates a memory file system management configuration for allocating memory from a shared storage configuration, according to example embodiments. Referring to FIG. 3C, the configuration 360 provides a set of memory nodes A 366 and B 368, which operate with a shared storage 362. The example provides a compute framework 364 blocking requests and acknowledgements 374 from a master node 372 and performs write commands 376 to a MFS 370. The MFS 370 may aggregate writes and acknowledgements 378 to a memory node A 366 then close 382 the connection to the MFS 370 and 384 to the memory node 366. Also, the acknowledgments 386 are also closed and the extended attributes 388 are shared. The master node 372 may then cache and commit data 392 via the MFS 370 and the acknowledgment is also closed 394 to the computer framework 364.

According to example embodiments, with the advent of the SSD disk drives used, the latency of data from those disk types is removed almost entirely, to a few 100 microseconds. The network latency and associated jitter will still start to impact the overall throughput at the application level. The delay problems are even more exacerbated with really fast storage drives, such as NVMe. With NVMe storage devices, latency goes down even more between 20 microseconds to under 10 microseconds, and as a result, the network latency is the primary concern. When the network is congested the delay concerns experience even more negative impacts. Specifically, TCP suffers from 'InCast', which happens when multiple nodes send data to a single node, causing sudden congestion at the outgoing port of the switch connected to the node that needs data from many nodes. The switch at some point starts to drop packets, and this can cause TCP to back off and sometimes reset the connection. While UDP may eliminate this kind of behavior there are other issues of reliability associated with UDP-based transport mechanism.

Figure 4:
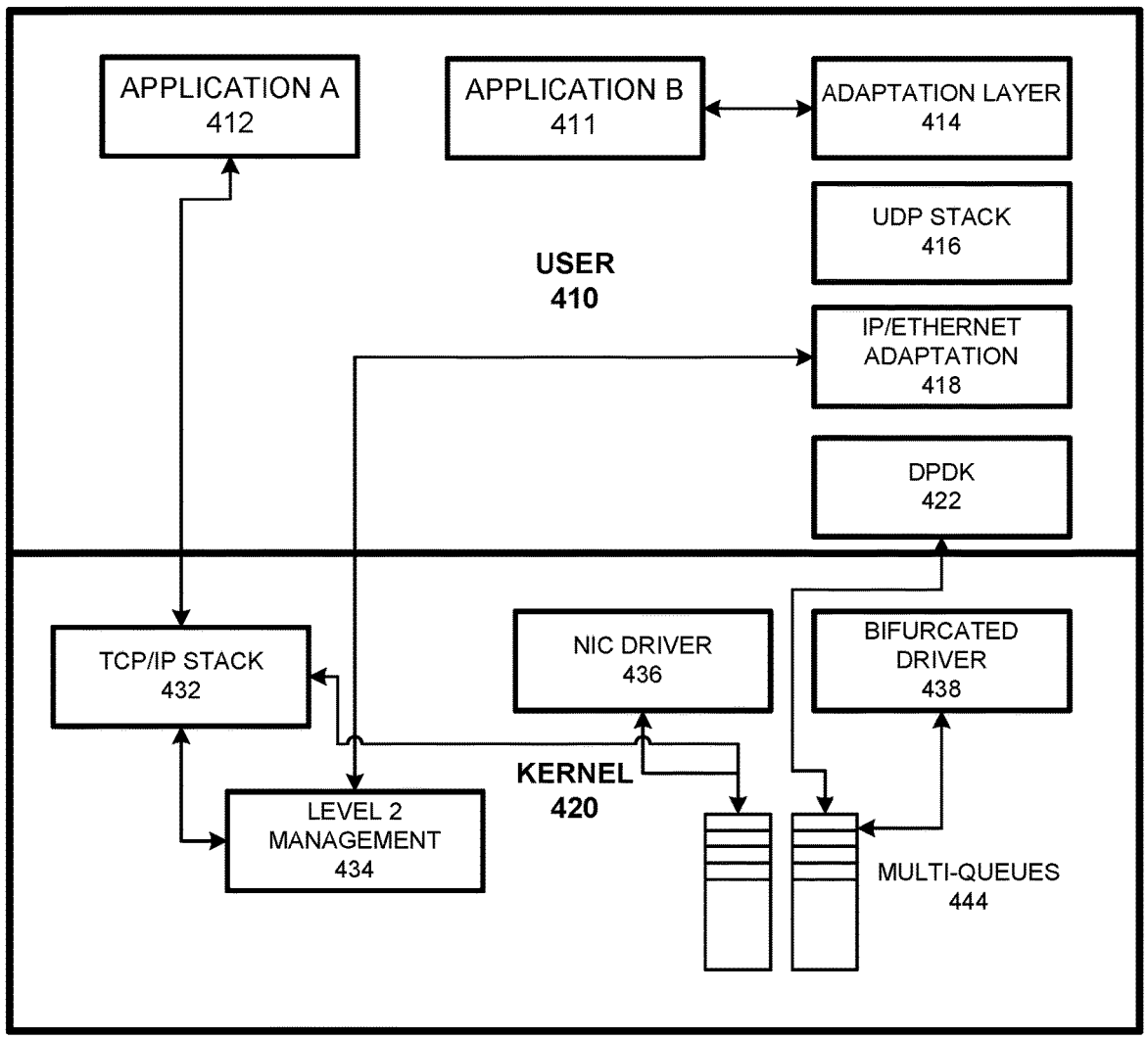
FIG. 4 illustrates a memory management configuration with a bifurcated kernel driver, according to example embodiments.

FIG. 4 illustrates a memory management configuration with a bifurcated kernel driver, according to example embodiments. Referring to FIG. 4, the configuration 400 provides the ability to read/write data into a network interface card (NIC) from a user space 410, and not have to depend on a LINUX kernel 420 to process and pass data to an application through copies. This configuration also provides for a poll-mode driver, where a NIC does not cause interruptions and instead a driver polls the NIC at periodic intervals and retrieves all packets that the NIC has received and/or send all packets the applications may have encountered. The LINUX kernel is used for all layer-2 L2 (e.g., Ethernet) and layer-3 L3 (e.g., IP) control traffic 432, thus implementing L2 protocols, such as ARP and LLDP, etc. The approach uses the UDP stack 416 that operates in the user space with an adaptation layer 414 and an IP/Ethernet adaptation layer 418, and a modified congestion control mechanism based on explicit congestion notification ECN. The data planning development kit 422 may be used to communicate with the NIC and the packet queues 444. Such an implementation provides more predictive transfer of data between applications A 412 and B 411 and the NIC 436, as the data is transferred from the user space to the NIC directly in the kernel 420. In addition, the poll-mode mechanism permits for low jitter. Usage of UDP prevents 'InCast' even with congestion. In fact, the higher-level goal is to prevent congestion from occurring. Reliability of transferred data is assured through a constant feedback between hosts that permits each host to understand the extent of congestion it is causing and thus permits itself to back off momentarily, so that congestion is prevented in switches. The implementations are confined to hosts, and do not require any software or hardware changes to network switches. The switches are configured to not drop packets, and instead set ECN bits when a certain threshold is reached. When a host receives packets with ECN set, the host then sets the ECN bits in the acknowledgement of the packet, back to the sender. The sender will then calculate the fraction of frames received with ECN set from the total frames received. Depending on the fraction of ECN frame, the sender either decreases or increases the data rate. As a further refinement, using the "Bifurcated Driver" 438 implementation in the kernel this permits the NIC to be under the control of the kernel 420. Also, all ISO layer 2 (L2/Ethernet) functions 434 are kept in the kernel 420, so handling in the user space is not required. This is achieved by using the multi-queue support function of the NIC. The bifurcated driver 438 is called to allocate some of the queues 444 to the DPDK 422 driver, and this permits for direct movement of data between the NIC and the user-space 410. The bifurcated driver 438 is used only for the initial setup. All data movements happen between the user space 410 and the NIC 436. The architecture is particularly well suited when new applications are written, and both sides of the application that communicate are written to use the stack and its efficiencies.

Figure 5:
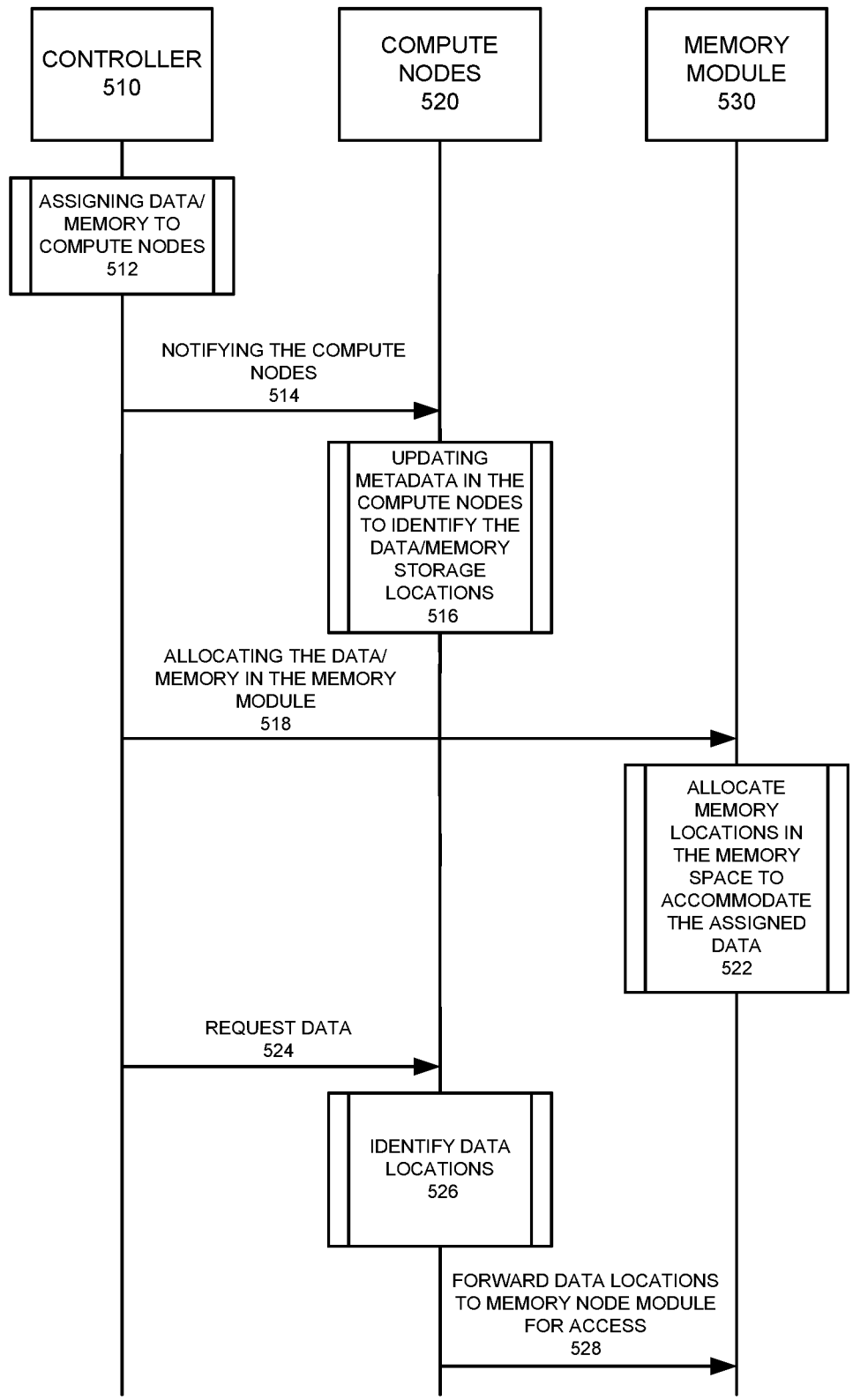
FIG. 5 illustrates a system messaging diagram for performing memory allocations and memory access operations according to example embodiments.

FIG. 5 illustrates a system messaging diagram for performing memory allocations and memory access operations according to example embodiments. Referring to FIG. 5, the system includes a controller 510, compute nodes 520 and a memory module 530. The system 500 provides for assigning data and/or memory to certain compute nodes 512 so the compute nodes can manage data assignments and tasks. The compute nodes are notified of the allocation 514 and may be made to understand the data is part of there infrastructure when in fact the memory allocations are in a solid state disk located elsewhere. The metadata updated 516 and is used to notify the compute nodes of the allocated memory via mappings and points to the remote disk. The data is allocated 518 in memory of the memory module 530. The memory rewrites its allocations 522 to permit for new changes to the memory assignments. The subsequent data access operations 524 can then be managed by the compute nodes by identifying the data locations 526 and sending requests for the data to the memory module file systems used to process the requests 528.

Figure 6A:
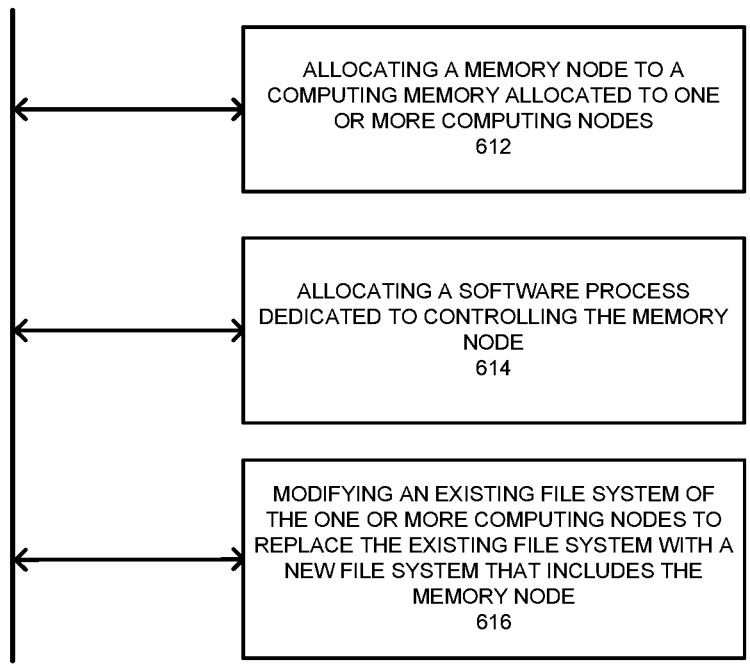
FIG. 6A illustrates a flow diagram of an example method of memory allocation and access operations, according to example embodiments.

FIG. 6A illustrates a flow diagram of an example method 600A of memory allocation and access operations, according to example embodiments. Referring to FIG. 6, the method includes allocating a memory node to a computing memory allocated to one or more computing nodes 612, allocating a software process dedicated to controlling the memory node 614, and modifying an existing file system of the one or more computing nodes to replace the existing file system with a new file system that comprises the memory node 616. The method may also include allocating a fixed amount of the computing memory to the one or more computing nodes, and the fixed amount of the computing memory allocated to the one or more computing nodes is based on an amount of data being managed by each of the plurality of computing nodes, and each of the one or more computing nodes are allocated a same amount of the computing memory. The method may also include assigning, via a memory file system, file-system proxies to identified file systems operating in the computing nodes, and assigning two or more of the computing nodes to the computing memory, and the memory node includes a plurality of solid state disks. The method may also include identifying a data block request and an acknowledgement, writing the acknowledgment to a memory file system as metadata, identifying an aggregated set of write transactions, updating the memory node with the aggregated set of write transactions, and closing an active session prior to updating the memory node. The method may also include identifying a data set requiring data analysis, identifying the one or more computing nodes to perform the data analysis, forwarding metadata to each of the one or more computing nodes, the metadata including an indicator that identifies the data set as being stored in each of the computing nodes, identifying file input/output (I/O) memory access commands intended for each of the computing nodes, and forwarding the I/O memory access commands to the memory node.

Figure 6B:
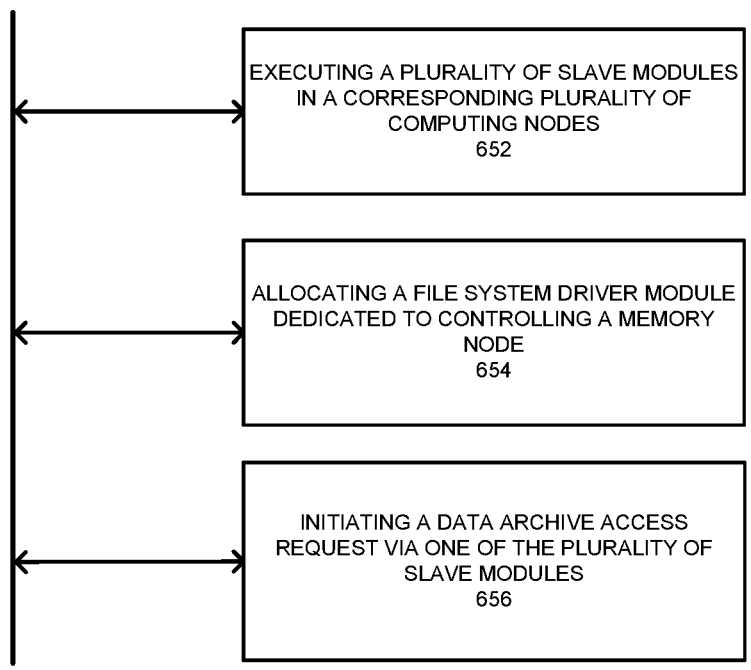
FIG. 6B illustrates a flow diagram of example method of performing data access operations, according to example embodiments.

FIG. 6B illustrates a flow diagram of example method of performing data access operations, according to example embodiments. The method 600B may include executing a plurality of slave modules in a corresponding plurality of computing nodes 652, allocating a file system driver module dedicated to controlling a memory node 654, and initiating a data archive access request via one of the plurality of slave modules 656. The method may also include receiving the data archive request for a data block at a first slave module from a second slave module, and determining whether the first slave module is storing the data block in a local cache of the first slave module. If the first slave module is not storing the data block in the local cache, transmitting a pointer, identifying a location in the memory node where the data block is located, to the second slave module. The method may also include transmitting the request to the file system driver module, and receiving a notification to contact the first slave module which is associated with the data block being requested. The memory node includes a plurality of solid state disks. The data block is stored in a known location identified as being associated with the first slave module.

Figure 6C:
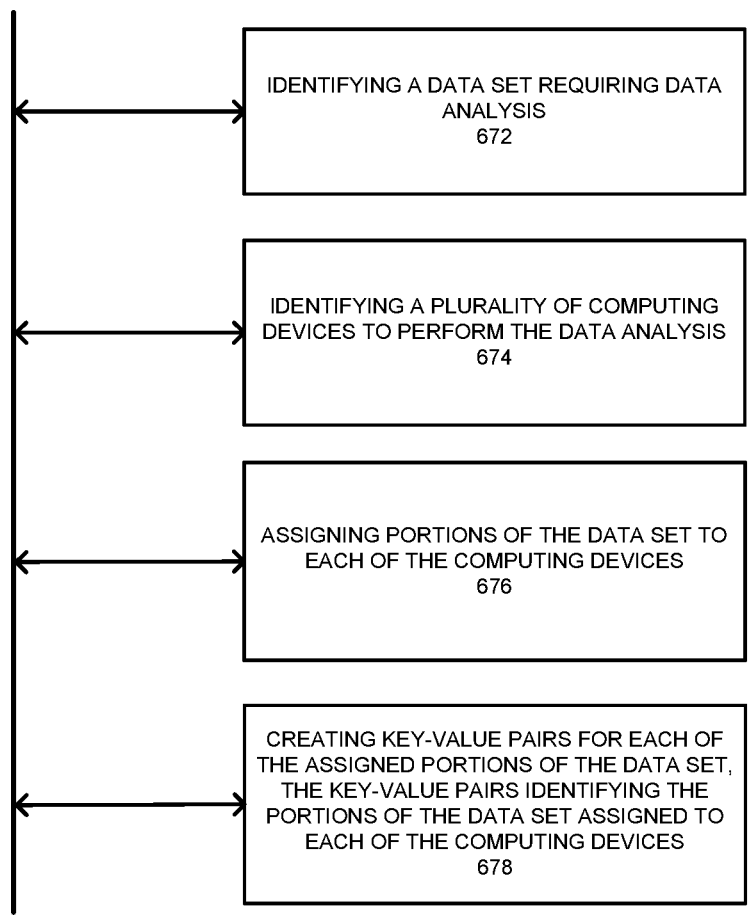
FIG. 6C illustrates a flow diagram of example method of allocating memory across computing nodes to perform data analysis, according to example embodiments.

FIG. 6C illustrates a flow diagram of example method 600C of allocating memory across computing nodes to perform data analysis, according to example embodiments. The method may include identifying a data set requiring data analysis 672, identifying a plurality of computing devices to perform the data analysis 674, assigning portions of the data set to each of the computing devices 676, and creating key-value pairs for each of the assigned portions of the data set, the key-value pairs identifying the portions of the data set assigned to each of the computing device 678. The method may also include forwarding the key-value pairs to the plurality of computing devices. The key-value pair includes a profile and timestamp associated with a data segment of the data set. The portions of the data set assigned to the plurality of computing nodes are evenly allocated to provide a same portion size of the data set to each of the computing nodes. The method may include storing the portions of the data set in a memory node separate from the plurality of computing nodes, assigning metadata to each of the plurality of computing nodes identifying memory storage locations of the portions of the data set in the memory node. The metadata includes pointers indicating blocks of the memory node where the portions of the data set are stored and the memory node includes solid state disks.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
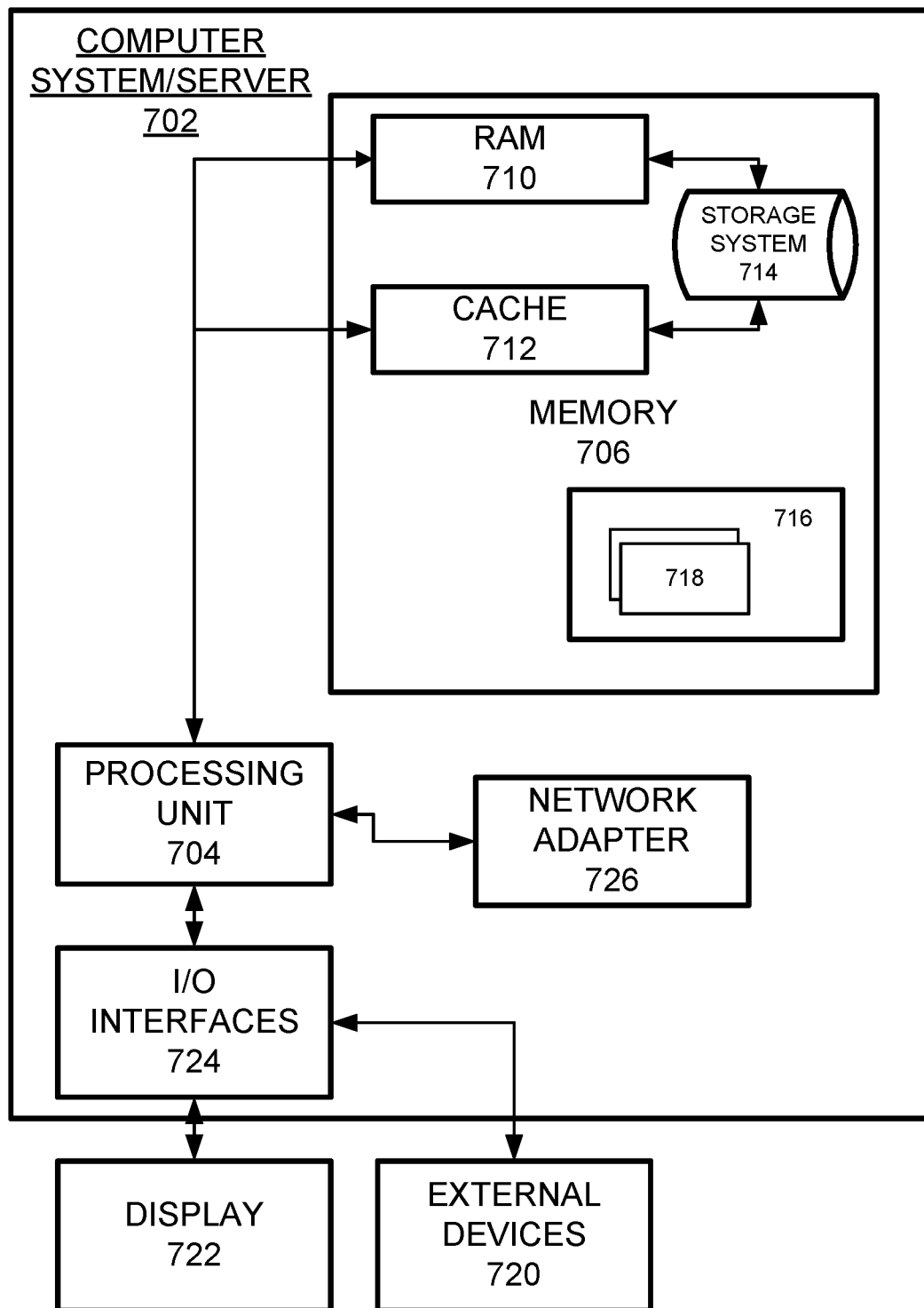
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   allocating a memory node to a computing memory allocated to one or more computing nodes;
   allocating a software process dedicated to controlling the memory node;
   modifying an existing file system of the one or more computing nodes to replace the existing file system with a new file system that comprises the memory node;
   assigning, via a memory file system, file-system proxies to identified file systems operating in the computing nodes;
   assigning two or more of the computing nodes to the computing memory, and wherein the memory node comprises a plurality of solid state disks;
   identifying a data block request and an acknowledgement;
   writing the acknowledgment to the memory file system as metadata;
   identifying an aggregated set of write transactions;
   updating the memory node with the aggregated set of write transactions; and
   closing an active session prior to updating the memory node.

2. The method of claim 1, further comprising:
   allocating a fixed amount of the computing memory to the one or more computing nodes.

3. The method of claim 2, wherein the fixed amount of the computing memory allocated to one or more computing nodes is based on an amount of data being managed by each of the plurality of computing nodes.

4. The method of claim 2, wherein each the one or more computing nodes are allocated a same amount of the computing memory.

5. The method of claim 1, further comprising:
   identifying a data set requiring data analysis;
   identifying the one or more computing nodes to perform the data analysis;
   forwarding metadata to each of the one or more computing nodes, the metadata comprising an indicator that identifies the data set as being stored in each of the computing nodes;
   identifying file input/output (I/O) memory access commands intended for each of the computing nodes; and
   forwarding the I/O memory access commands to the memory node.

6. An apparatus, comprising:
   a processor configured to
   allocate a memory node to a computing memory allocated to one or more computing nodes;
   allocate a software process dedicated to controlling the memory node;

modify an existing file system of the one or more computing nodes to replace the existing file system with a new file system that comprises the memory node;

identify a data set requiring data analysis;

identify the one or more computing nodes to perform the data analysis;

forward metadata to each of the one or more computing nodes, the metadata including an indicator that identifies the data set as being stored in each of the computing nodes;

identify file input/output (I/O) memory access commands intended for each of the computing nodes; and forward the I/O memory access commands to the memory node.

7. The apparatus of claim 6, wherein the processor is further configured to allocate a fixed amount of the computing memory to the one or more computing nodes.

8. The apparatus of claim 7, wherein the fixed amount of the computing memory allocated to one or more computing nodes is based on an amount of data being managed by each of the plurality of computing nodes.

9. The apparatus of claim 7, wherein each the one or more computing nodes are allocated a same amount of the computing memory.

10. The apparatus of claim 6, wherein the processor is further configured to assign, via a memory file system, file-system proxies to identified file systems operating in the computing nodes, and assign two or more of the computing nodes to the computing memory, and wherein the memory node comprises a plurality of solid state disks.

11. The apparatus of claim 10, wherein the processor is further configured to identify a data block request and an acknowledgement, write the acknowledgment to the memory file system as metadata, identify an aggregated set of write transactions, update the memory node with the aggregated set of write transactions, and close an active session prior to updating the memory node.

12. A non-transitory computer readable storage medium configured to store instructions that when executed cause a processor to perform:

allocating a memory node to a computing memory allocated to one or more computing nodes;

allocating a software process dedicated to controlling the memory node;

modifying an existing file system of the one or more computing nodes to replace the existing file system with a new file system that comprises the memory node;

assigning, via a memory file system, file-system proxies to identified file systems operating in the computing nodes;

assigning two or more of the computing nodes to the computing memory, and wherein the memory node comprises a plurality of solid state disks;

identifying a data block request and an acknowledgement;

writing the acknowledgment to the memory file system as metadata;

identifying an aggregated set of write transactions;

updating the memory node with the aggregated set of write transactions; and closing an active session prior to updating the memory node.

13. The non-transitory computer readable storage medium of claim 12, wherein the processor is further configured to perform:

allocating a fixed amount of the computing memory to the one or more computing nodes.

14. The non-transitory computer readable storage medium of claim 13, wherein the fixed amount of the computing memory allocated to one or more computing nodes is based on an amount of data being managed by each of the plurality of computing nodes.

15. The non-transitory computer readable storage medium of claim 13, wherein each the one or more computing nodes are allocated a same amount of the computing memory.

16. The non-transitory computer readable storage medium of claim 12, wherein the processor is further configured to perform:

identifying a data set requiring data analysis;

identifying the one or more computing nodes to perform the data analysis;

forwarding metadata to each of the one or more computing nodes, the metadata comprising an indicator that identifies the data set as being stored in each of the computing nodes;

identifying file input/output (I/O) memory access commands intended for each of the computing nodes; and forwarding the I/O memory access commands to the memory node.

\* \* \* \* \*